United States Patent
Keel et al.

(10) Patent No.: US 8,059,776 B2
(45) Date of Patent: Nov. 15, 2011

(54) METHOD AND SYSTEM FOR SUB-CHIP RESOLUTION FOR SECONDARY CELL SEARCH

(75) Inventors: Alton Shelborne Keel, Melbourne, FL (US); Louis Robert Litwin, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 874 days.

(21) Appl. No.: 11/795,063

(22) PCT Filed: Jan. 14, 2005

(86) PCT No.: PCT/US2005/001186
§ 371 (c)(1),
(2), (4) Date: Jul. 10, 2007

(87) PCT Pub. No.: WO2006/080904
PCT Pub. Date: Aug. 3, 2006

(65) Prior Publication Data
US 2008/0137776 A1    Jun. 12, 2008

(51) Int. Cl.
*H04L 7/00* (2006.01)
*H04L 7/04* (2006.01)

(52) U.S. Cl. ........ 375/365; 370/491; 370/500; 375/354; 375/362

(58) Field of Classification Search .............. 375/365
See application file for complete search history.

(56) References Cited

U.S. PATENT DOCUMENTS

| | | | |
|---|---|---|---|
| 5,060,239 A * | 10/1991 | Briscoe et al. | 375/260 |
| 5,483,292 A * | 1/1996 | Ko | 348/537 |
| 5,648,893 A | 7/1997 | Loo et al. | |
| 5,648,983 A | 7/1997 | Kostic et al. | |
| 5,764,687 A | 6/1998 | Easton | |
| 5,796,775 A * | 8/1998 | Aoyama | 375/150 |
| 5,995,512 A * | 11/1999 | Pogue, Jr. | 370/419 |
| 6,067,293 A | 5/2000 | Shoji | |
| 6,185,199 B1 | 2/2001 | Zehavi | |
| 6,366,606 B1 | 4/2002 | Sriram | |
| 6,480,527 B1 | 11/2002 | Kim | |
| 6,700,925 B1 | 3/2004 | Ohnishi | |
| 6,771,693 B2 | 8/2004 | Hackett | |

(Continued)

FOREIGN PATENT DOCUMENTS

CN      1189265     7/1998

(Continued)

OTHER PUBLICATIONS

M. Kiessling et al: "Performance enhancements to the UMTS (W-CDMA) initial cell search algorithm" 2002 IEEE Int'l Conference on Communications. Conference Proceedings, New York, NY, Apr. 28-May 2, 2002, vol. vol. 1 of 5, Apr. 28, 2002, pp. 590-594.

(Continued)

*Primary Examiner* — David C. Payne
*Assistant Examiner* — Erin M File
(74) *Attorney, Agent, or Firm* — Robert D. Shedd; Joseph J. Opalach

(57) ABSTRACT

A Universal Mobile Telecommunications System (UMTS) receiver comprises an adjustable delay line, a secondary synchronization processor and a controller. The secondary synchronization processor performs frame synchronization on a received wireless signal that is provided via the adjustable delay line. The controller varies the sub-chip timing delays provided by the adjustable delay line until a measure of accuracy of the frame synchronization process exceeds a predetermined threshold, upon which frame synchronization occurs.

13 Claims, 4 Drawing Sheets

U.S. PATENT DOCUMENTS

| | | |
|---|---|---|
| 6,888,372 B1 * | 5/2005 | Hazanchuk ............... 326/39 |
| 7,130,331 B2 | 10/2006 | Kang et al. |
| 7,248,635 B1 * | 7/2007 | Arneson et al. ........... 375/257 |
| 7,327,779 B1 | 2/2008 | Lugil et al. |
| 7,352,704 B1 | 4/2008 | Toussi et al. |
| 7,532,663 B2 | 5/2009 | Lewis |
| 7,630,730 B2 | 12/2009 | Becker et al. |
| 7,684,472 B2 | 3/2010 | Litwin et al. |
| 2001/0004378 A1 | 6/2001 | Takeuchi et al. |
| 2001/0036222 A1 | 11/2001 | Doetsch et al. |
| 2002/0110103 A1 | 8/2002 | Jung |
| 2002/0110123 A1 | 8/2002 | Shitama |
| 2003/0103476 A1 | 6/2003 | Choi et al. |
| 2003/0103557 A1 | 6/2003 | Dolwin |
| 2003/0123528 A1 | 7/2003 | Hackett |
| 2003/0156462 A1 * | 8/2003 | Lim et al. ............ 365/189.05 |
| 2003/0161390 A1 | 8/2003 | Teague et al. |
| 2003/0169702 A1 | 9/2003 | Ryu et al. |
| 2003/0176171 A1 | 9/2003 | Sato et al. |
| 2003/0193922 A1 | 10/2003 | Ho et al. |
| 2003/0202541 A1 * | 10/2003 | Lim et al. ............... 370/503 |
| 2003/0202565 A1 | 10/2003 | Li et al. |
| 2003/0223384 A1 | 12/2003 | Sengupta et al. |
| 2003/0235238 A1 | 12/2003 | Schelm et al. |
| 2004/0017846 A1 | 1/2004 | Fernandez-Corbaton |
| 2004/0062297 A1 | 4/2004 | McDonough et al. |
| 2004/0071199 A1 | 4/2004 | Boesel et al. |
| 2004/0085921 A1 | 5/2004 | Lin |
| 2004/0165566 A1 | 8/2004 | Lee et al. |
| 2004/0240529 A1 | 12/2004 | Leonard et al. |
| 2004/0250049 A1 | 12/2004 | Becker et al. |
| 2005/0002369 A1 | 1/2005 | Ro et al. |
| 2005/0002442 A1 | 1/2005 | Litwin et al. |
| 2005/0002446 A1 | 1/2005 | Litwin et al. |
| 2005/0047492 A1 | 3/2005 | Amerga et al. |
| 2005/0053049 A1 | 3/2005 | Blanz et al. |
| 2005/0100230 A1 | 5/2005 | Moore |
| 2005/0207479 A1 | 9/2005 | Ruprich et al. |
| 2005/0208959 A1 | 9/2005 | Chen et al. |
| 2005/0225804 A1 | 10/2005 | Arquilevich et al. |
| 2006/0126491 A1 | 6/2006 | Ro et al. |
| 2006/0188005 A1 | 8/2006 | Espax |
| 2006/0199596 A1 | 9/2006 | Teauge et al. |
| 2007/0025428 A1 | 2/2007 | Hahm et al. |
| 2007/0189410 A1 | 8/2007 | Zeng |
| 2008/0130720 A1 | 6/2008 | Dolwin |
| 2008/0225963 A1 | 9/2008 | Lakkis |
| 2009/0258605 A1 | 10/2009 | Boos |

FOREIGN PATENT DOCUMENTS

| | | |
|---|---|---|
| CN | 1280428 | 7/2001 |
| CN | 1365211 | 8/2002 |
| DE | 10241693 | 3/2004 |
| EP | 0691754 | 1/1996 |
| EP | 0994572 | 4/2000 |
| EP | 1075090 | 2/2001 |
| EP | 1109323 | 6/2001 |
| EP | 1517454 | 3/2005 |
| JP | 10173629 | 6/1998 |
| JP | 10240388 | 9/1998 |
| JP | 2000124847 | 4/2000 |
| JP | 20000349681 | 12/2000 |
| JP | 2004164566 | 6/2004 |
| JP | 2006520149 | 8/2006 |
| WO | WO2004082149 | 9/2004 |

OTHER PUBLICATIONS

Search Report Dated Sep. 9, 2005.

Bahl, "Reconfigurable Synchronization Circuit for Software Defined Radios using On-Chip Processor in FPGAs", University of Maryland, Baltimore, MD.

Elders-Boll, "WCDMA Baseband Design Faces Challenges", Wireless Systems Design, Jan./Feb. 2003.

Kiessling et al., "Performance Enhancements to the UMTS (W-CDMA) Initial Cell Search Algorithm", Agere Systems, IEEE, 2002.

* cited by examiner

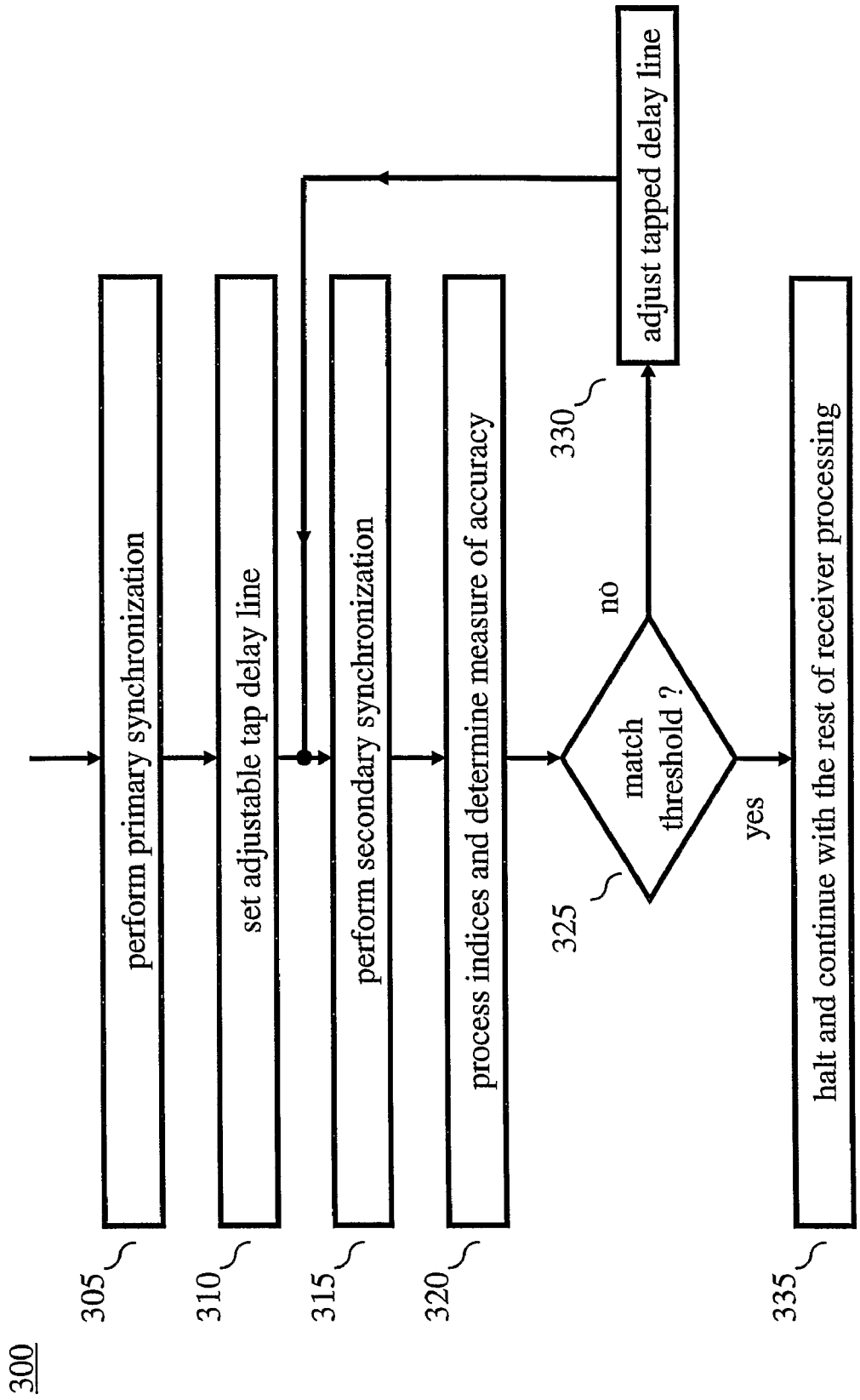

METHOD AND SYSTEM FOR SUB-CHIP RESOLUTION FOR SECONDARY CELL SEARCH

This application claims the benefit, under 35 U.S.C. §365 of International Application PCT/US2005/001186, filed Jan. 14, 2005, which was published in accordance with PCT Article 21(2) on Aug. 3, 1006 in English. This application is related to copending, commonly assigned, U.S. patent applications Ser. Nos., 11/795,062 entitled SEARCHER HARDWARE TO PERFORM SCRAMBLING CODE DETERMINATION, filed on Jul. 10, 2007; Ser. No. 11/795,049 entitled EFFICIENT MAXIMAL RATIO COMBINER FOR CDMA SYSTEMS, filed on Jul. 10, 2007; Ser No. 11/794,973 entitled RAM-BASED SCRAMBLING CODE GENERATOR FOR CDMA, filed on Jul. 9, 2007; and Ser. No. 11/792,885 entitled HARDWARE-EFFICIENT SEARCHER ARCHITECTURE FOR CDMA CELLULAR RECEIVERS, filed on Jun. 11, 2007.

BACKGROUND OF THE INVENTION

The present invention generally relates to secondary cell searching within $3^{rd}$ generation (3G) wireless networks.

Universal Mobile Telecommunications System (UMTS) is a standard for 3G wireless networks, as defined by the International Telecommunications Union. UMTS defines a communication scheme composed of slots (2560 chips/slot), with 15 slots forming a frame (38,400 chips per frame). As is known, "chip" or "chip rate" refers to the rate of the spreading code within a Code Division Multiple Access (CDMA) communication system. Each slot specifies, among other data, synchronization information used to synchronize communications between nodes of a UMTS compliant network.

An important procedure performed by a receiver within a UMTS network, for example one disposed within a mobile terminal, is the cell search operation. A cell search operation typically is performed after the receiver is powered on to determine synchronization information pertaining to the cell in which the receiver is located. The cell search operation generally accomplishes three things: slot synchronization, frame synchronization, and scrambling code determination.

In performing the cell search operation, the receiver accesses a Synchronization Channel (SCH) and a Common Pilot Channel (CPICH) of the transmitted signal. The SCH is a composite channel formed from a Primary SCH and a Secondary SCH. Within each slot, the Primary SCH specifies a Primary Synchronization Code (PSC). However, the Primary SCH only contains data during the first 256 chips of each 2560 chip slot.

The receiver uses the Primary SCH to acquire slot synchronization with a cell. Typically this is performed using a single matched filter, or other similar device. The filter is matched to the PSC which is common to all cells. The slot timing of a cell can be obtained by detecting peaks in the matched filter output.

The receiver performs frame synchronization using the Secondary SCH. The Secondary SCH specifies, within each slot, a Secondary Synchronization Code (SSC). Unlike the PSC, the SSC can be one of 16 different codes and each slot contains one SSC. The SSC used varies from slot to slot to form a sequence that has a period of one frame, or 15 slots. There are 64 possible SSC sequences and each sequence corresponds to one of 64 possible scrambling code groups. By observing a full frame of data, the receiver can determine which of the 64 SSC sequences is being transmitted. Since the SSC sequence repeats with a period equal to one frame, the sequence can be used to achieve frame synchronization at the receiver because frame boundaries can be identified. The SSC sequence that is transmitted further indicates which scrambling code group is used in the current cell.

Each scrambling code group includes 8 possible scrambling codes. To determine the actual scrambling code, the received CPICH signal can be correlated with each of the 8 possible scrambling codes in the identified scrambling code group until the correct scrambling code is determined. After the actual scrambling code has been identified, the Primary Common Control Channel (CCPCH) can be detected so that system and cell specific Broadcast Channel (BCH) information can be read.

A typical approach to Secondary SCH acquisition is to store, for each slot, the index of the strongest of the 16 SSC correlations. To find the SSC sequence with the highest number of matches, the resulting 15 indices are compared to reference sequences for all 64 possible scrambling code groups. From this comparison, the transmitted scrambling code group and the frame offset can be determined.

The processor used for Primary SCH acquisition typically is a single hardware device that is implemented with sub-chip accuracy. This higher accuracy allows the receiver to start the Secondary SCH correlation with improved accuracy. Because Secondary SCH processing involves performing 16 parallel correlations, one correlation for each of the 16 possible transmitted SSC codes, the Secondary SCH processors frequently are configured to use a single sample per chip to ease hardware requirements.

In an ideal environment, use of one sample per chip for Secondary Synchronization would not be problematic as the primary SCH processor would ideally synchronize to within a ¼ chip of the actual start of the slot. Accordingly, the Secondary SCH processor would work successfully despite using a single sample per chip. In practice, however, harsh channel environments can result in offsets of a ¼ of a chip or more during Primary Synchronization due to noise and other channel effects or distortions. If such synchronization offsets occur, performing Secondary Synchronization with only one sample per chip can result in a degraded correlation peak or, possibly, a completely erroneous correlation.

It would be desirable to perform Secondary SCH correlations with sub-chip accuracy while avoiding the significant increase in hardware that would result from implementing a typical sub-chip accurate Secondary SCH processor.

SUMMARY OF THE INVENTION

In accordance with the principles of the invention, a receiver comprises an adjustable delay line for providing a received wireless signal via one of a number of selectable taps; and a processor for performing frame synchronization on the received wireless signal from a selected tap, wherein the taps are in sub-chip timing increments.

In an illustrative embodiment, a receiver conforms to a UMTS receiver and comprises an adjustable delay line, a secondary synchronization processor and a controller. The secondary synchronization processor performs frame synchronization on a received wireless signal that is provided via the adjustable delay line. The controller varies the sub-chip timing delays provided by the adjustable delay line until a measure of accuracy of the frame synchronization process exceeds a predetermined threshold, upon which frame synchronization occurs. In another variation of this embodiment, the UMTS receiver also comprises a primary synchronization processor that processes a signal from the adjustable delay line for determining slot synchronization.

BRIEF DESCRIPTION OF THE DRAWINGS

Preferred embodiments of the present invention will be described below in more detail, with reference to the accompanying drawings, in which:

FIG. 4 is a flow chart illustrating a method of cell searching in accordance with yet another embodiment of the present invention.

DETAILED DESCRIPTION

Other than the inventive concept, the elements shown in the figures are well known and will not be described in detail. Also, familiarity with UMTS-based wireless communications systems is assumed and is not described in detail herein. For example, other than the inventive concept, spread spectrum transmission and reception, cells (base stations), user equipment (UE), downlink channels, uplink channels, the searcher, combiner and RAKE receivers are well known and not described herein. In addition, the inventive concept may be implemented using conventional programming techniques, which, as such, will not be described herein. Finally, like-numbers on the figures represent similar elements.

The present invention provides a solution for achieving sub-chip accuracy during Secondary Synchronization of a cell search operation within a UMTS network. More particularly, an adjustable tapped delay line is implemented within a cell search system of a UMTS receiver. Primary Synchronization can also be performed using a signal obtained from a particular register of this delay line. Secondary Synchronization can be performed using a signal from any of multiple registers of this delay line. Illustratively the particular register from which a signal is obtained for performing Secondary Synchronization can be varied according to a measure of accuracy used to evaluate the quality of each Secondary Synchronization. Thus, for each subsequent Secondary Synchronization, the signal used can be obtained from a different register of the delay line. As the delay line has a plurality of registers within a span of a single chip, sub-chip accuracy for Secondary Synchronizations is achieved without significant increases or changes in hardware.

Figure 1:
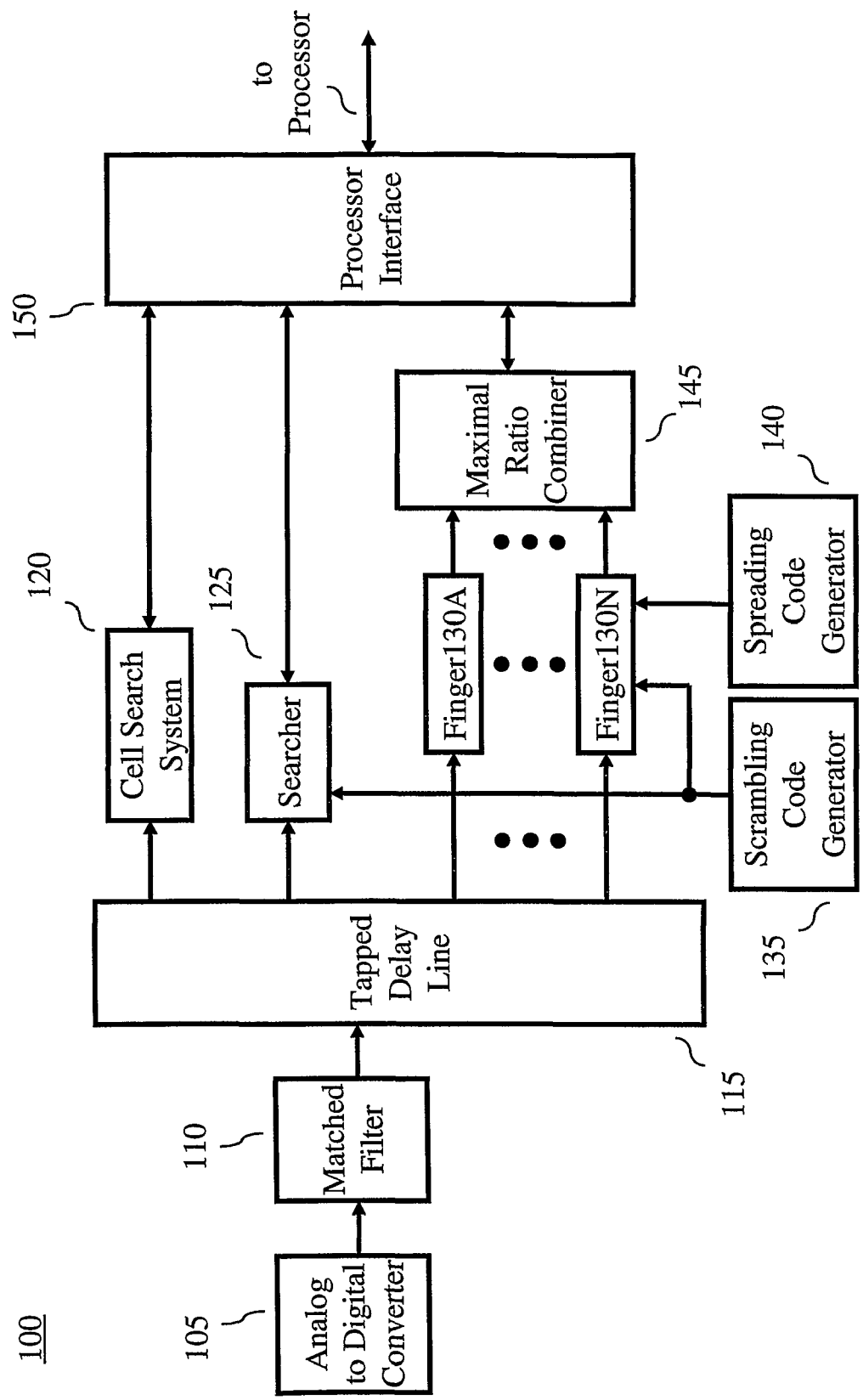
FIG. 1 is a schematic diagram illustrating a receiver for use with wireless networks in accordance with the inventive arrangements disclosed herein.

FIG. 1 is a schematic diagram illustrating a receiver 100 for use with wireless networks in accordance with the inventive arrangements disclosed herein. In one aspect of the present invention, the receiver 100 is illustratively a UMTS receiver such as a CDMA receiver. As shown in FIG. 1, the receiver 100 comprises an analog-to-digital converter 105 for converting received analog signals into digital representations thereof. The resulting digital signal is provided to a matched filter 110.

The filtered signal is provided to a tapped delay line 115, which further provides signals to a cell search system 120, a searcher 125, as well as one or more fingers 130A-130N. The tapped delay line 115 includes a plurality of taps through which various samples of a received signal are provided. Each tap provides a different delayed version of the received signal. The tapped delay line 115 is illustratively sub-chip in terms of resolution, i.e., the various output signals provided by tapped delay line 115 are spaced at intervals of less than a chip.

The signal provided to the cell search system 120 includes timing information. More particularly, the signal includes a composite SCH and a CPICH. The cell search system 120 determines timing information using the provided signal. For example, the search system 120 performs operations such as slot synchronization, frame synchronization, and scrambling code determination (described further below).

Once the scrambling code is known, a scrambling code generator 135 generates the portion of the scrambling code needed by the searcher 125 and the fingers 130A-130N. The searcher 125, using scrambling codes provided by the scrambling code generator 135, performs correlation at different offsets to obtain profiles of different multi-path signals. Each of the fingers 130A-130N can be assigned to a different multi-path signal as determined by the searcher 125. Fingers 130A-130N further process the various multi-path signals using a spreading code provided by a spreading code generator 140. A maximal ratio combiner 145 phase aligns the individual multi-path signals from each finger 130A-130N using the CPICH. The maximal ratio combiner 145 produces a constructively combined signal that is provided to a processor interface 150.

A processor (not shown) can be included to facilitate communications among the various components of the receiver 100 through the processor interface 150. Thus, e.g., the various fingers 130A through 130N can be assigned to different paths of the received multipath signal as determined by searcher 125.

Figure 2:
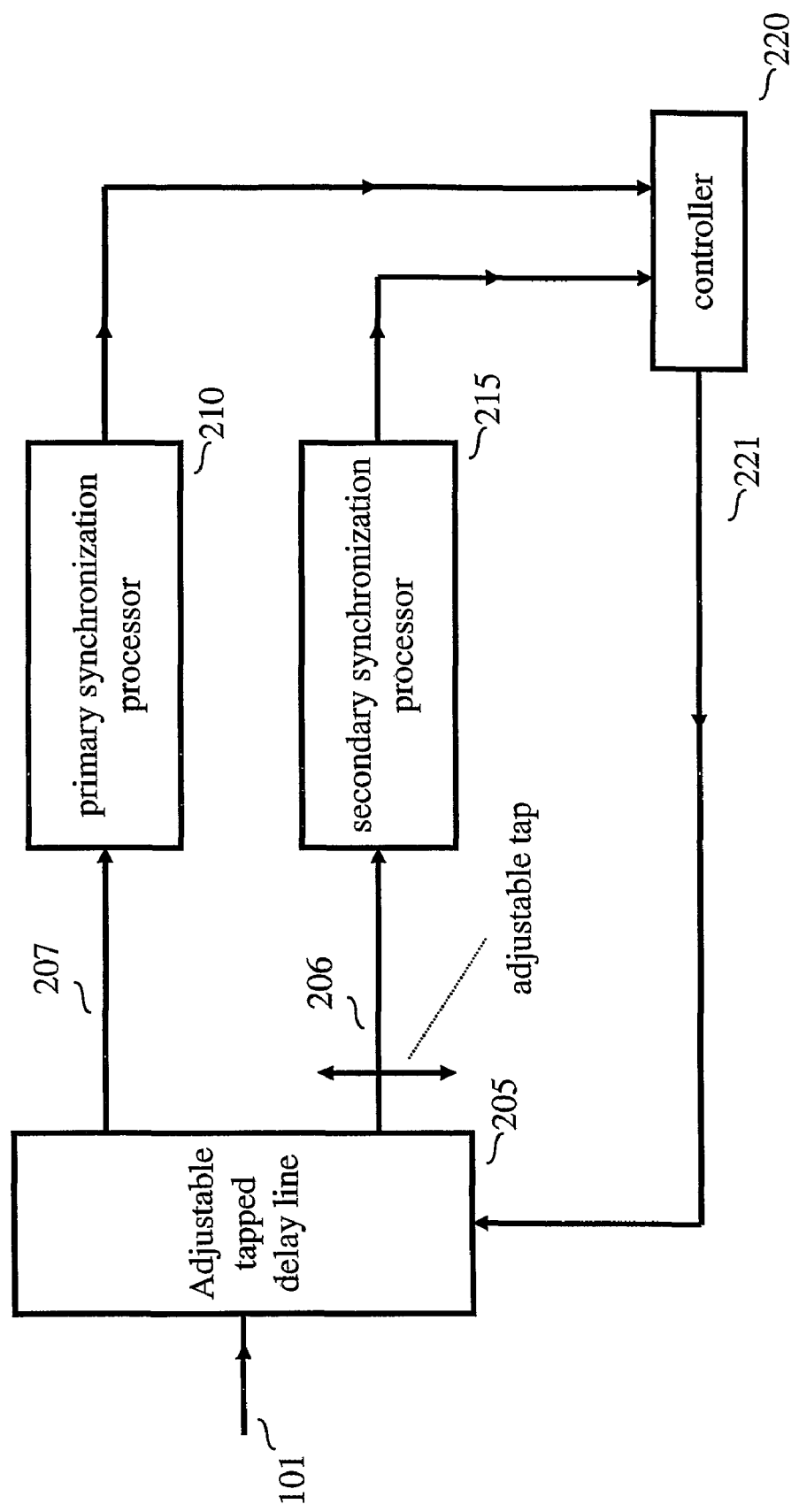
FIG. 2 is a schematic diagram illustrating a cell search system which can be used with the receiver of FIG. 1, in accordance with the inventive arrangements disclosed herein.

FIG. 2 is a schematic diagram illustrating a cell search system 120 which can be used with the receiver 100 of FIG. 1, in accordance with the inventive arrangements disclosed herein. As shown, the cell search system 120 comprises an adjustable tapped delay line 205, a primary synchronization processor 210, a secondary synchronization processor 215, and a controller 220. The adjustable tapped delay line 205 receives sub-chip resolution samples (101). As noted, the received signal specifies a composite SCH and a CPICH.

Figure 3:
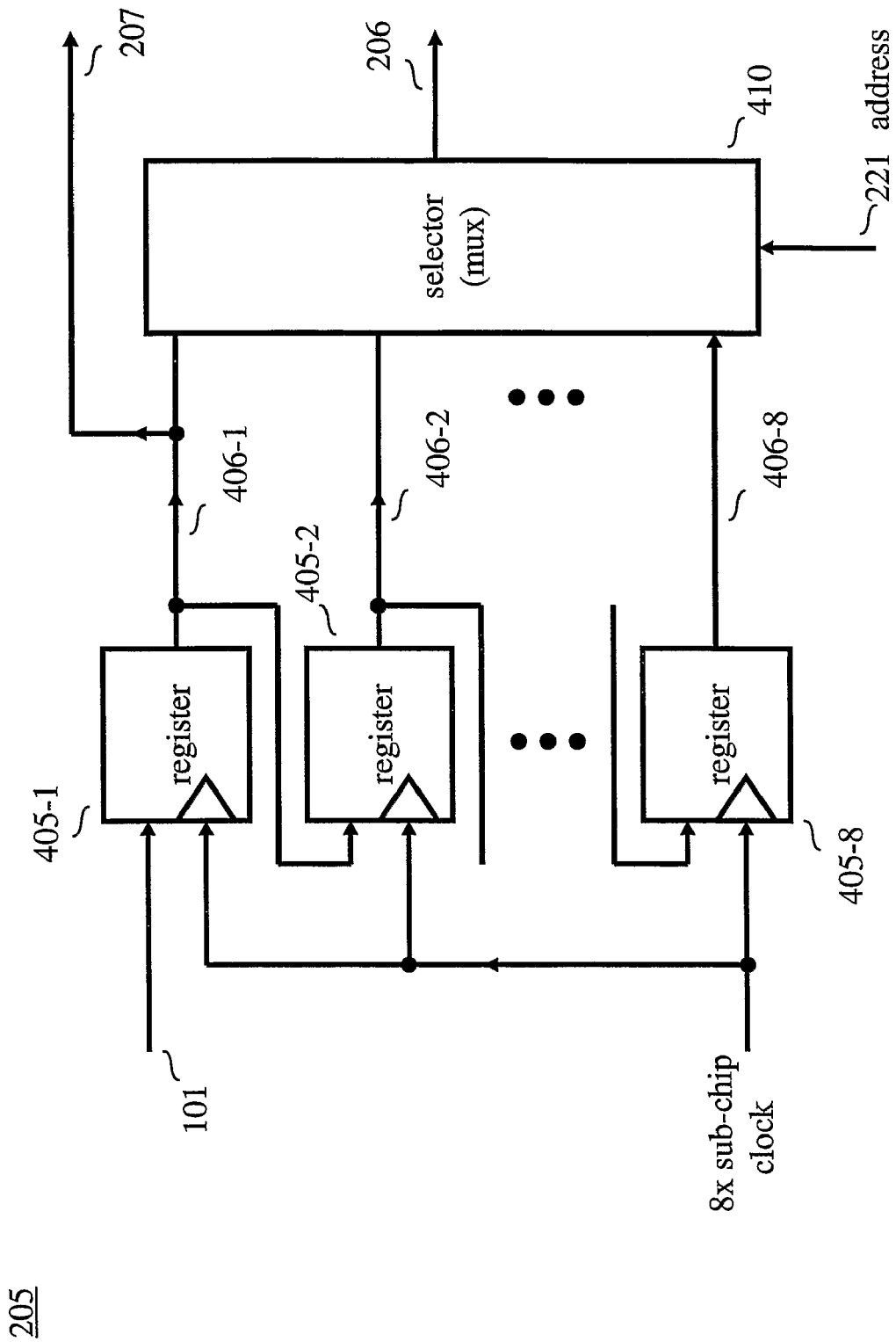
FIG. 3 is an illustrative diagram of an adjustable tapped delay line for use in the cell search system of FIG. 2.

The adjustable tapped delay line 205 can include a number of registers depending upon the resolution desired. For example, if 4 registers are included in the tapped delay line, then ¼ chip resolution can be achieved. If the adjustable tapped delay line 205 has 8 registers, then ⅛ chip resolution can be achieved. Turning briefly to FIG. 3, an illustrative embodiment of an adjustable tapped delay line 205 comprising 8 registers is shown. Adjustable tapped delay line 205 comprises eight registers, 405-1 through 405-8, and a selector, or multiplexer (mux), 410. The registers are clocked at 8× the chip rate. At each clock pulse, a value of the input signal (101) is clocked into the first register, 405-1, and previous values of the input signal move sequentially through the other registers. Thus, every eight clock pulses a particular input sample will first appear at signal 406-1, then signal 406-2 till finally appearing at signal 406-8. Each of these output signals is applied to mux 410. A particular one of the output signals (taps) is selected as output signal 206 of mux 410 via address signal 221.

In any case, the present invention is not limited by the number of registers included within the adjustable tapped delay line 205. It should be appreciated, however, that the resolution achievable by the adjustable tapped delay line 205 is limited by the resolution of the incoming signal. In illustration, if the adjustable tapped delay line 205 includes 8 registers, but the incoming signal 101 has only ¼ chip resolution, the maximum resolution attainable from the adjustable tapped delay line 205 will be ¼ chip resolution.

Returning to FIG. 2, the adjustable tapped delay line 205 provides a signal 207 to the primary synchronization processor 210 from the same register (e.g., register 405-1 of FIG. 3) and a signal 206 to the secondary synchronization register 215 from any of the registers. In other words, the tap used by the primary synchronization processor is not adjustable; while the tap used by the secondary synchronization processor is adjustable via address signal 221. However, the inventive concept is not so limited. Illustratively, controller 220 controls address signal 221 (described below).

The primary synchronization processor 210 is capable of performing sub-chip accurate correlation operations. As such, the primary synchronization processor 210 is provided signal, or samples, from a fixed or same register of the adjustable tapped delay line 205, as described above. Accordingly, the samples are from a same location of the adjustable tapped delay line 205 and have a consistent delay.

The primary synchronization processor 210 performs a Primary Synchronization. The primary synchronization processor 210 processes the Primary SCH specified by the signal and correlates the Primary SCH to obtain slot synchronization as known in the art. More particularly, the received samples are correlated against the PSC code specified in the Primary SCH to time-align the receiver with the Primary SCH. The time-alignment is accomplished by searching for a correlation peak. Once the peak is found, the receiver can use the index of the peak to adjust its internal timing.

The secondary synchronization processor 215 is provided with samples from any of the various registers of the adjustable tapped delay line 205. Accordingly, the amount of delay for the signal varies with the register of the adjustable tapped delay line 205 from which the samples are obtained. The secondary synchronization processor 215 performs a Secondary Synchronization. That is, the secondary synchronization processor 215 correlates the Secondary SCH specified by the signal to obtain frame synchronization.

As noted, the structure of the Secondary SCH is such that each slot contains a different SSC code. The SSC code can be one of sixteen possible SSC codes. A typical UMTS receiver architecture performs sixteen correlations, one for each possible SSC code, in parallel for the first 256 chips of each slot. The peak of the sixteen correlations is stored for each slot, resulting in a sequence consisting of 15 peak correlation values, one for each slot.

This peak correlation sequence is compared against the 64 possible Secondary SCH sequences to find the closest match. Once the closest match is determined, a measure of accuracy which indicates how closely the peak correlation sequence matches the selected Secondary SCH sequence is illustratively calculated by the controller 220. The measure of accuracy can be used to vary the register of the adjustable tapped delay line 205 from which samples are provided to the secondary synchronization processor 215.

Based upon the measure of accuracy, the controller 220 controls the adjustable tapped delay line 205 to provide samples to the secondary synchronization processor 215 from a different one of the registers, via address signal 221. Thus, for subsequent Secondary Synchronizations, the signal used is taken from a register that is selected based upon the measure of accuracy. The register from which samples are obtained for Secondary Synchronization can be continually varied until the measure of accuracy reaches a predetermined threshold. Because the adjustable tapped delay line 205 has more than one register within a single chip range, sub-chip resolution during Secondary Synchronization is available.

When the measure of accuracy reaches the predetermined threshold, no further Secondary Synchronizations need be performed. The receiver 100 can then determine the degree of slot offset and adjust its internal timing to achieve frame synchronization. In addition, the matched Secondary SCH sequence also indicates which scrambling code group is being used in the current cell.

FIG. 4 is a flow chart illustrating a method 300 of a cell search operation in accordance with yet another embodiment of the present invention. The method 300 is performed by a UMTS receiver having a cell search system as described with reference to FIG. 2. The method 300 can begin in step 305 where Primary Synchronization is performed using a sub-chip accurate correlator, such as the primary synchronization processor to obtain slot synchronization.

In step 310, the adjustable tapped delay line is adjusted to provide samples to the secondary synchronization processor from a particular or selected register. In one embodiment, the register is initially the same one used to provide the signal to the primary synchronization processor. It should be appreciated, however, that this need not be the case and other registers can be initially used.

In step 315, a Secondary Synchronization is performed. The secondary synchronization processor performs sixteen correlations, one for each possible SSC, in parallel for the first 256 chips of each slot. The peak of the sixteen correlations is stored for each slot and the result is a sequence consisting of 15 values, one for each slot.

In step 320, the sequence of peak correlations is compared against the 64 possible Secondary SCH sequences to find the closest match. Once the closest match is found, a measure of accuracy which indicates how closely the peak correlation sequence matches the selected Secondary SCH sequence can be calculated.

The closest matching Secondary SCH sequence can be found by selecting the Secondary SCH sequence that matches the most individual peak correlations of the peak correlation sequence. In illustration, for each Secondary SCH sequence, the peak correlations 1-15 are compared with the SSCs 1-15. Accordingly, for each Secondary SCH sequence, the first peak correlation is compared with the first SSC, the second peak correlation to the second SSC, and so on. The Secondary SCH sequence that matches the most SSCs is the best match and is selected. The number of peak correlations that match the selected Secondary SCH sequence can be used as a measure of accuracy. The measure of accuracy will be a number between 1 and 15 and provides an indication as to how closely the Secondary SCH sequence matches the peak correlation sequence.

In step 325, a determination is made as to whether the measure of accuracy exceeds a predetermined threshold. If not, the method proceeds to step 330. In step 330 a different tap of adjustable tap delay line 205 is selected for use by the secondary synchronization processor. Accordingly, the method can loop back to step 315 to perform Secondary Synchronization using the signal from the different tap. Notably, the particular register (tap) that is selected can be a register that is next to the register already used. That is, a register to the left or right of the prior register can be selected. Still, the invention is not limited to selecting registers in this manner, and any different register (tap) can be selected as may be desired.

If the measure of accuracy exceeds the predetermined threshold in step 325, the method proceeds to step 335. In step 335, cell searching is halted so that other receiver processing can continue. For example, the selected Secondary SCH sequence is used to determine the scrambling code group. As is known, once the scrambling code group is known, the particular scrambling code can be determined by correlating against the CPICH using each of the 8 possible scrambling codes of the selected scrambling code group.

The iterative nature of method 300 allows Secondary SCH correlations to be performed with sub-chip accuracy. Each time a subsequent Secondary Synchronization is performed, the particular register from which samples are taken can be changed. Since the adjustable delay line includes a plurality of registers within a range of a single chip, sub-chip resolution is achieved without the need for overly complex circuitry.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs) and/or in one or more stored program-controlled processors (e.g., a microprocessor or digital signal processor (DSP)). Similarly, although illustrated in the context of a UMTS-based system, the inventive concept is applicable to other communications system. It is therefore to be understood that numerous modifications may be made to the illustrative embodiments and that other arrangements may be devised without departing from the spirit and scope of the present invention as defined by the appended claims.

The invention claimed is:

1. A receiver comprising:
    an adjustable delay line for providing a received wireless signal via one of a number of selectable taps;
    a primary synchronization processor coupled to one of the number of selectable taps for performing slot synchronization to the received wireless signal, wherein the tap used by the primary synchronization processor does not change; and
    a secondary synchronization processor for processing the received wireless signal from a selected tap for performing frame synchronization;
    wherein the taps are in sub-chip timing increments.

2. The receiver of claim 1, further comprising a controller for determining the selected tap.

3. The receiver of claim 2, wherein the controller varies the selected tap as a function of a measure of accuracy of the frame synchronization until the measure of accuracy exceeds a predetermined threshold.

4. The receiver of claim 3, wherein the measure of accuracy is a number of matches to a scrambling code group.

5. The receiver of claim 1, wherein the adjustable delay line comprises:
    a plurality of registers, each register corresponding to a respective one of the number of selectable taps and wherein each register provides a different time delayed version of the received wireless signal and wherein time delays are in sub-chip timing increments; and
    a multiplexer, responsive to an address signal for selecting a particular one of the plurality of registers as the selected tap.

6. The receiver of claim 1, wherein the received wireless signal is a Universal Mobile Telecommunications System (UMTS) signal.

7. The receiver of claim 1, comprising:
    a cell search system for performing frame synchronization to a received wireless signal; and
    a processor for use in enabling wireless communication upon completion of frame synchronization.

8. A method for use in a receiver, the method comprising:
    providing a received wireless signal via one of a number of selectable taps;
    performing slot synchronization to the received wireless signal using one of the number of selectable taps, wherein the tap used while performing slot synchronization does not change; and
    processing the received wireless signal from a selected tap for performing frame synchronization;
    wherein the taps are in sub-chip timing increments.

9. The method of claim 8, wherein the processing step includes the step of determining the selected tap.

10. The method of claim 8, wherein the processing step includes the step of:
    varying the selected tap as a function of a measure of accuracy of the frame synchronization until the measure of accuracy exceeds a predetermined threshold.

11. The method of claim 10, wherein the measure of accuracy is a number of matches to a scrambling code group.

12. The method of claim 8, wherein the received wireless signal is a Universal Mobile Telecommunications System (UMTS) signal.

13. The method of claim 8, comprising:
    enabling wireless communication upon completion of frame synchronization.

* * * * *